United States Patent [19]

Janssens et al.

[11] 4,115,866
[45] Sep. 19, 1978

[54] DATA PROCESSING NETWORK FOR COMMUNICATIONS SWITCHING SYSTEM

[75] Inventors: Juliaan Leo Gerard Janssens, Olmen; Marie Jeanne Françoise Louise Ghislaine Malherbe, Berchem, both of Belgium

[73] Assignee: International Standard Electric Corporation, New York, N.Y.

[21] Appl. No.: 684,422

[22] Filed: May 7, 1976

Related U.S. Application Data

[63] Continuation of Ser. No. 335,683, Feb. 26, 1973.

[30] Foreign Application Priority Data

Feb. 25, 1972 [NL] Netherlands .................. 7202503

[51] Int. Cl.² .................................................. G06F 1/00
[52] U.S. Cl. ................................................... 364/900
[58] Field of Search ...................... 340/172.5; 444/1; 179/18 AG, 18 ES; 364/200 MS FIle, 300

[56] References Cited

U.S. PATENT DOCUMENTS

| | | | |
|---|---|---|---|
| 3,503,048 | 3/1970 | Avsan et al. ................ | 340/172.5 |
| 3,557,315 | 1/1971 | Kobus et al. ................ | 179/18 AG |
| 3,581,291 | 5/1971 | Iwamoto et al. ............. | 340/172.5 |
| 3,735,360 | 5/1973 | Anderson et al. ............ | 340/172.5 |
| 3,771,137 | 11/1973 | Barner et al. ............... | 340/172.5 |
| 3,775,566 | 11/1973 | Akimaru et al. ............. | 179/18 ES |

OTHER PUBLICATIONS

Devereaux, J.A., "An Application–Oriented Multiprocessing System III. Control Program Features", IBM Systems Journal, vol. 6, No. 2, 1967, pp. 95–102.

*Primary Examiner*—Gareth D. Shaw
*Attorney, Agent, or Firm*—James B. Raden; Marvin M. Chaban

[57] ABSTRACT

A toll programming system includes a plurality of processors having individual memories and sharing a common memory for controlling a toll telecommunication switching system by executing a plurality of programs divided in a first and second series. Each program of the first series is executed by one processor only (function distribution), whereas each program of the second series is executed by two or more processors (load sharing). In the latter case, conflicts are resolved by the use of treated-by-me tables. The processors employ mask words in their memories to enable them to distinguish which programs they may execute.

4 Claims, 13 Drawing Figures

DATA PROCESSING NETWORK FOR COMMUNICATIONS SWITCHING SYSTEM

This is a continuation, of application Ser. No. 335,683 filed Feb. 26, 1973.

BACKGROUND OF THE INVENTION

1. Field of the Invention.

The present invention relates to a data processing system including a plurality of processors and a controllable arrangement, telecommunication switching equipment. The processors control the arrangement through execution of a plurality of programs.

2. Description of the Prior Art.

Such a data processing system is known from U.S. Pat. No. 3,557,315, issued to S. Kobus et al. In this known system the controllable arrangement is in the form of telecommunication switching equipment and each of the processors is able to execute all of the programs needed to control all the operations required to establish a call communication through said switching equipment, or the like. Although each processor is able to completely control a call communication independently from another processor, inhibiting means have been provided in each processor to prevent a processor from executing simultaneously with another processor a program which controls the execution of switching operations in the switching equipment since this would otherwise lead to conflicting situations. A drawback of this known system is therefore that not only inhibiting means are required but that also each processor has to reckon with the other processors before being able to execute the last mentioned program.

SUMMARY OF THE INVENTION

An object of the present invention is therefore to provide a data processing system of the above type which does not require such inhibiting means and wherein the execution of the last mentioned program at least by one processor is independent from the other processors.

According to the present invention this is achieved by dividing the programs into a first series with each program thereof executed by one processor only and into a second series with each program thereof executed by at least two processors.

By allocating the execution of the above mentioned first series of programs to one of the processors obviously no conflicts may arise with another computer so that no inhibiting means are required. Also the execution of the mentioned series of programs by this processor is then independent from the other processor.

According to another characteristic of the invention the present data processing system is also characterized in that at least one of said processors has access to memory means, storing selected information concerning said arrangement and gathered by another processor, at least when said other processor becomes faulty in order to be able to continue the control of said arrangement already started by said other processor.

According to a further characteristic of the invention the present data processing system is also characterized in that said one and other processors are interconnected by interprocessor communication means used to transfer information between said processors and for instance from said other processor to said memory means of said one processor, said memory means forming part of an individual memory of said one processor.

When the data processing system for instance includes two processors which are interconnected by said interprocessor communication means and one of which executes the above mentioned programme whereas the other does not, the latter processor may advantageously make use of these communication means to request the one processor to execute this programme and to receive information from this processor regarding this operation.

Still another characteristic of the present invention is that said memory means form part of a common memory to which all said processors have access.

It should be noted that U.S. Pat. No. 3,503,048 already discloses a data processing system including a telecommunication switching equipment and a plurality of processors with a common memory and controlling the establishment of call communications through switching equipment by executing a plurality of programmes, each of these programmes being however executed by one processor only. Hence none of these programmes is executed by two or more processors. Such an extensive distribution of the programmes among all the processors has the drawback that for each call communication to be established the processors must operate in succession. Since the transfer of information among the processors is performed via the common memory this obviously leads to waiting times and hence to an increase of the time required to establish a call communication. It also involves the use of a relatively large queuing system to regulate the access of the processors to the common memory.

Contrary to this the present data processing system permits to distribute the programmes over the processors in a flexible way by allocating some programmes to a plurality of processors and others each to one processor only. Such flexibility is for instance useful when there is one long programme which cannot be readily matched as far as time of execution is concerned by a plurality of shorter programmes. In this case the long programme may be allocated to at least two of these processors whereas the other programmes may be distributed among them.

The present invention also relates to a data processing system including a plurality of computers each having an individual memory and having access to at least one common unit including at least one series of similar elements which are adapted to be handled by said computers, characterized in that each said individual memory stores at least one word table, the indications, e.g. bits, of which indicate whether or not the elements of said series should be handled by the computer of which said individual memory forms part.

The present invention further also relates to a data processing system including at least two computers each able to execute a plurality of programmes and each having an individual memory, characterized in that each of said individual memories stores a first mask word the indications of which indicate the programmes the corresponding computer is permitted to execute or not and that these mask words stored in the individual memories of said computers are different from each other.

According to a further aspect of the present invention, it relates to a data processing system including at least two computers each able to execute a plurality of programmes and each having an individual memory storing a time table, the indications, e.g. bits, of each word of this time table indicating programmes to be possibly executed during a corresponding time interval, the successive words of said table corresponding to successive time intervals and the tables of the processors being identical, characterized in that each of said individual memories further stores a first mask word the indications of which indicate the programmes the corresponding computer is permitted to execute or not and that these mask words stored in the individual memories of said computers are different from each other.

According to another aspect of the present invention, it also relates to a data processing system including at least two computers each able to execute a plurality of programmes and each having an individual memory storing a time table, the indications, e.g. bits, of each word of this time table indicating programmes to be possibly executed during a corresponding time interval, the successive words of said table corresponding to successive time intervals and the tables of the processors being identical, characterized in that said computers have a common memory storing a common second mask word the indications of which indicate the programmes the computers should not execute because no information is available to execute these programmes, and that each of said computers is able to modify said second mask word when information becomes available.

According to still another aspect of the present invention, it also relates to a data processing system including at least two computers each able to execute a plurality of programmes, characterized in that said computers have a common memory storing a plurality of third mask words which are each associated to a computer and the indications, e.g. bits, of which each indicate programmes which should absolutely be executed by the corresponding computer and that each of said third mask words may be modified by any of the computers.

According to still another aspect of the present invention, it relates to a data processing system including at least one computer able to execute a plurality of programmes and to provide for each of a plurality of successive time intervals a word which is stored in its individual memory and the constituent bits of a predetermined value of which indicate programmes to be executed during this time interval, each such bit being reset during this time interval after the execution of the corresponding programme by the corresponding computer thus modifying the word, characterized in that each computer is adapted to OR a said word provided for a new time interval and the modified word for the immediately preceding time interval to give a resultant word for the new time interval.

The above mentioned and other objects and features of the invention will become more apparent and the invention itself will be best understood by referring to the following description of an embodiment taken in conjunction with the accompanying drawings wherein:

FIGS. 3 and 4 represent the memories MA and MB of FIG. 1 in more detail;

Figure 6:
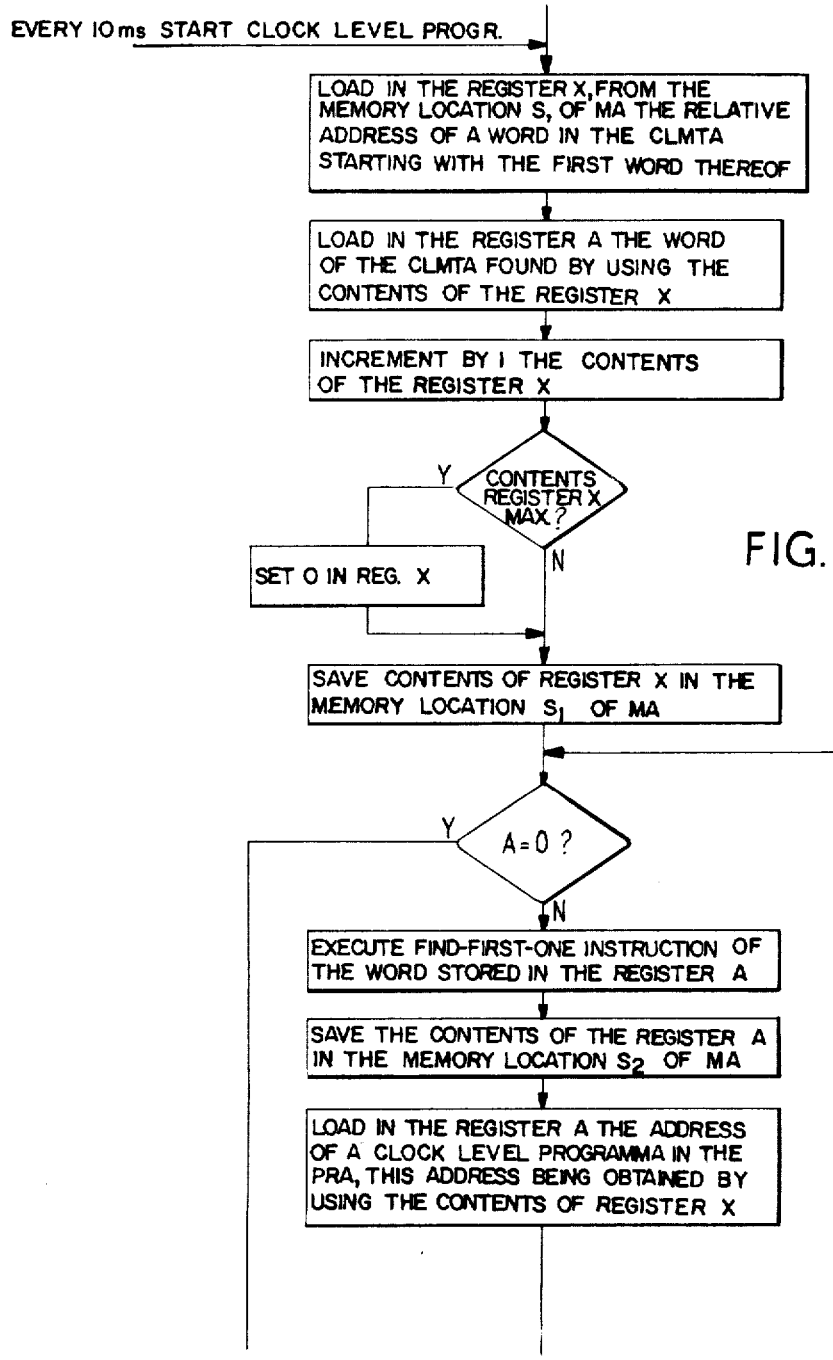
Figure 7:
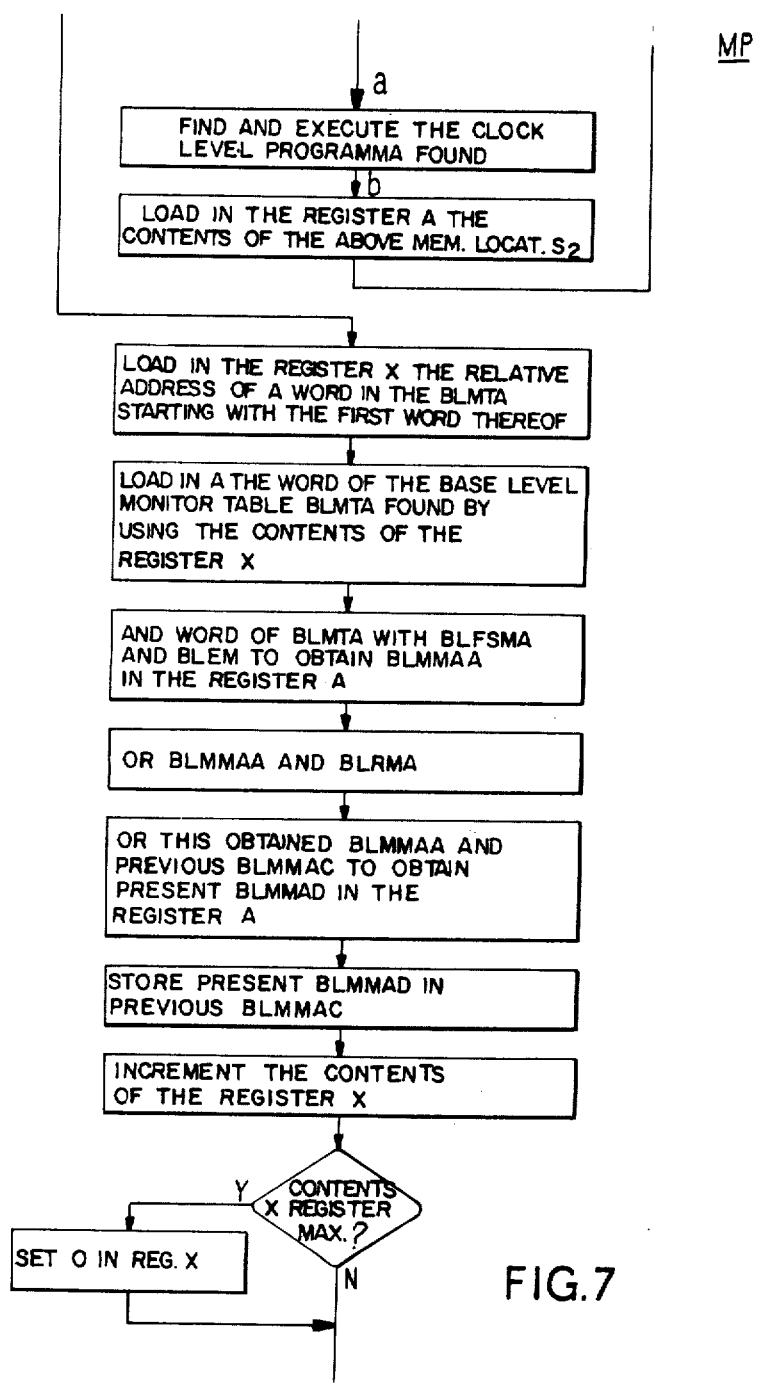
Figure 8:
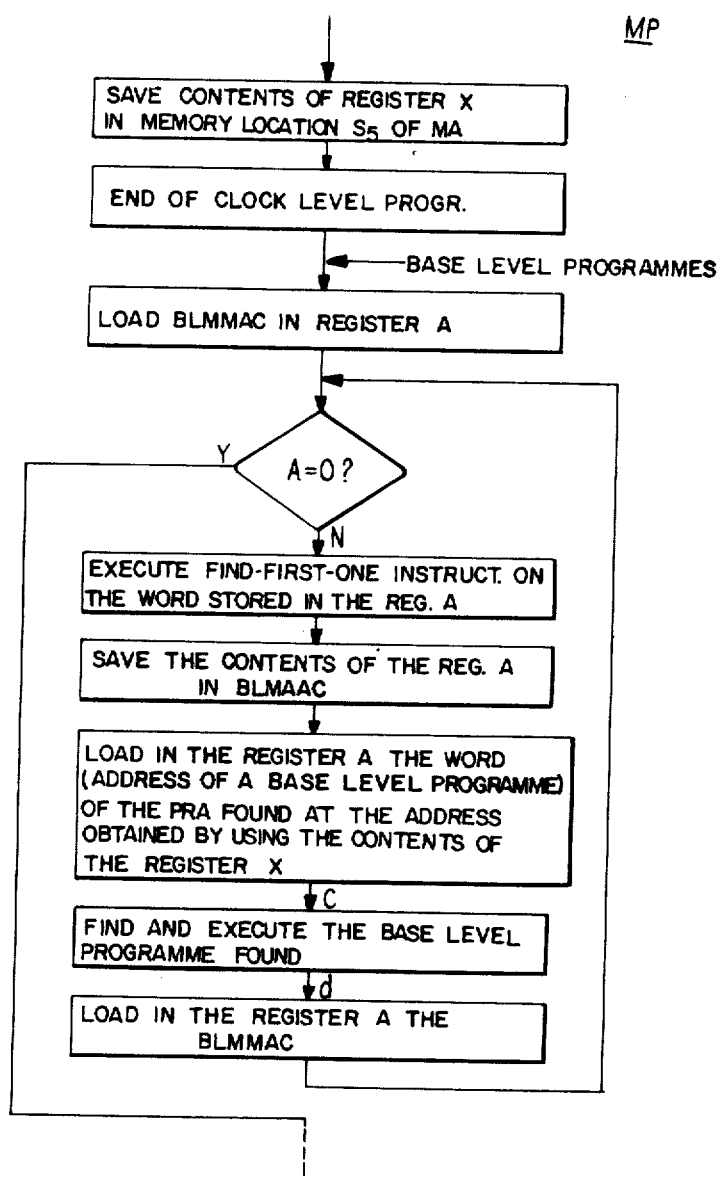

FIGS. 6 to 8 arranged below each other form a flow chart of a main programme stored in each of the memories MA and MB of FIG. 1;

FIGS. 9 to 13 show flow charts of some of the programmes forming part of this main programme.

Figure 1:
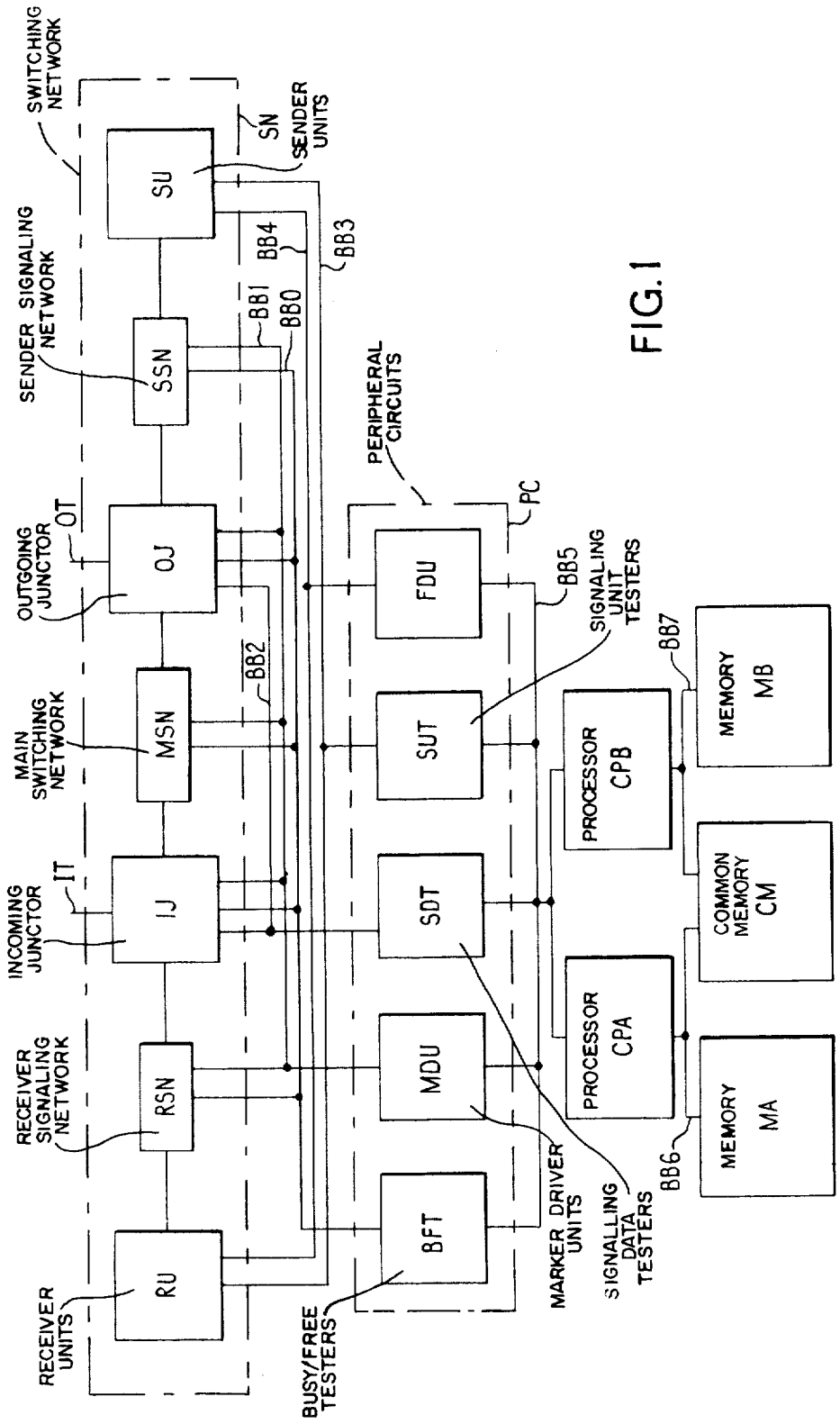
FIG. 1 is a schematic view of a data processing system according to the present invention.

Principally referring to FIG. 1 the data processing system shown therein includes a toll telecommunication switching system SN, PC and two computers. This switching system includes a switching network SN and the peripheral circuitry PC which is connected to the switching network SN via busbars BB0 to BB4. The two computers include the two processors CPA and CPB which are connected to the peripheral circuitry PC via busbar BB5, a common memory CM and two individual memories MA and MB. The processors CPA and CPB are connected to the memories CM, MA and CM, MB via the busbars BB6 and BB7 respectively. The switching network SN is constituted by a plurality of incoming junctors such as IJ which are connected to a plurality of outgoing junctors such as OJ via a main switching network MSN, the incoming and outgoing junctors being connected to incoming and outgoing trunks such as IT and OT leading to distant exchanges respectively. The incoming junctors such as IJ are moreover connected to a plurality of receiver units such as RU via a receiver signalling network RSN, whilst the outgoing junctors such as OJ are moreover connected to a plurality of sender units such as SU via a sender signalling network SSN. The switching networks MSN, RSN and SSN are each constituted by a plurality of switching stages interconnected by links.

The peripheral circuitry PC includes busy/free testers BFT, marker driver units MDU, signalling data testers SDT, signalling units testers SUT and fast driver units FDU. The BFT and the MDU are connected to the incoming and outgoing junctors and to the RSN, MSN and SSN via the busbars BB0 and BB1 respectively. The former units are able to test the free and busy conditions of these circuits, whereas the latter units are able to mark these circuits and operate or drive devices such as relays therein. The signalling data testers SDT are connected to the incoming and outgoing junctors via the busbar BB2 and are able to test the loop conditions of these circuits i.e. their connection to a distant exchange via an incoming and an outgoing trunk respectively. The signalling units testers SUT are connected to the receiver and sender units via the busbar BB3 and are able to test the busy and free conditions of these units and the presence of signals. Finally, the FDU are connected to the receiver and sender units via the busbar BB4 and are able to rapidly operate devices e.g. relays in these units.

It should be noted that in the same way as described in the above mentioned U.S. patent the switching network SN and the peripheral circuit PC are arranged in identical modules of about 2 000 incoming junctors and 2 000 outgoing junctors when the switching system is sufficiently large, each module including at least two BFT, MDU, SDT, SUT and FDU which are coupled to the processors CPA and CPB respectively. Hereby only one of the two SDT forming part of a module is normally used, the other being a spare.

Figure 2:
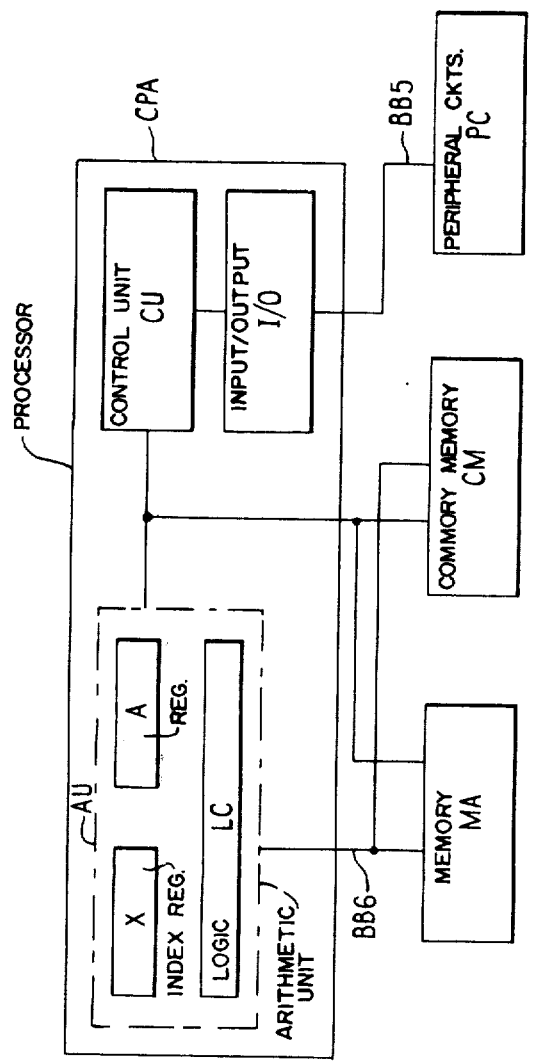
FIG. 2 shows in more detail the processor CPA of FIG. 1 coupled to the memories MA and CM and to the peripheral circuitry PC also shown in this figure.

Both the processors CPA and CPB are identical and well known in the art and therefore only one of them e.g. CPA is shown in relative detail in FIG. 2. This processor CPA includes an arithmetic unit AU, a control unit CU and input-output circuitry I/O. The control unit CU controls the various operations of the circuits CM, MA, AU and I/O and is therefore connected to these circuits. The input-output circuitry I/O is connected to the peripheral circuitry PC via the busbar BB5. The arithmetic unit AU includes amongst other circuitry a register or accumulator A which is adapted to store the results of arithmetic and logic operations, an index register X which allows address modifications and logic circuitry LC. The interconnections between A, X and LC are not shown since they are classical in the computer art.

Figure 3:
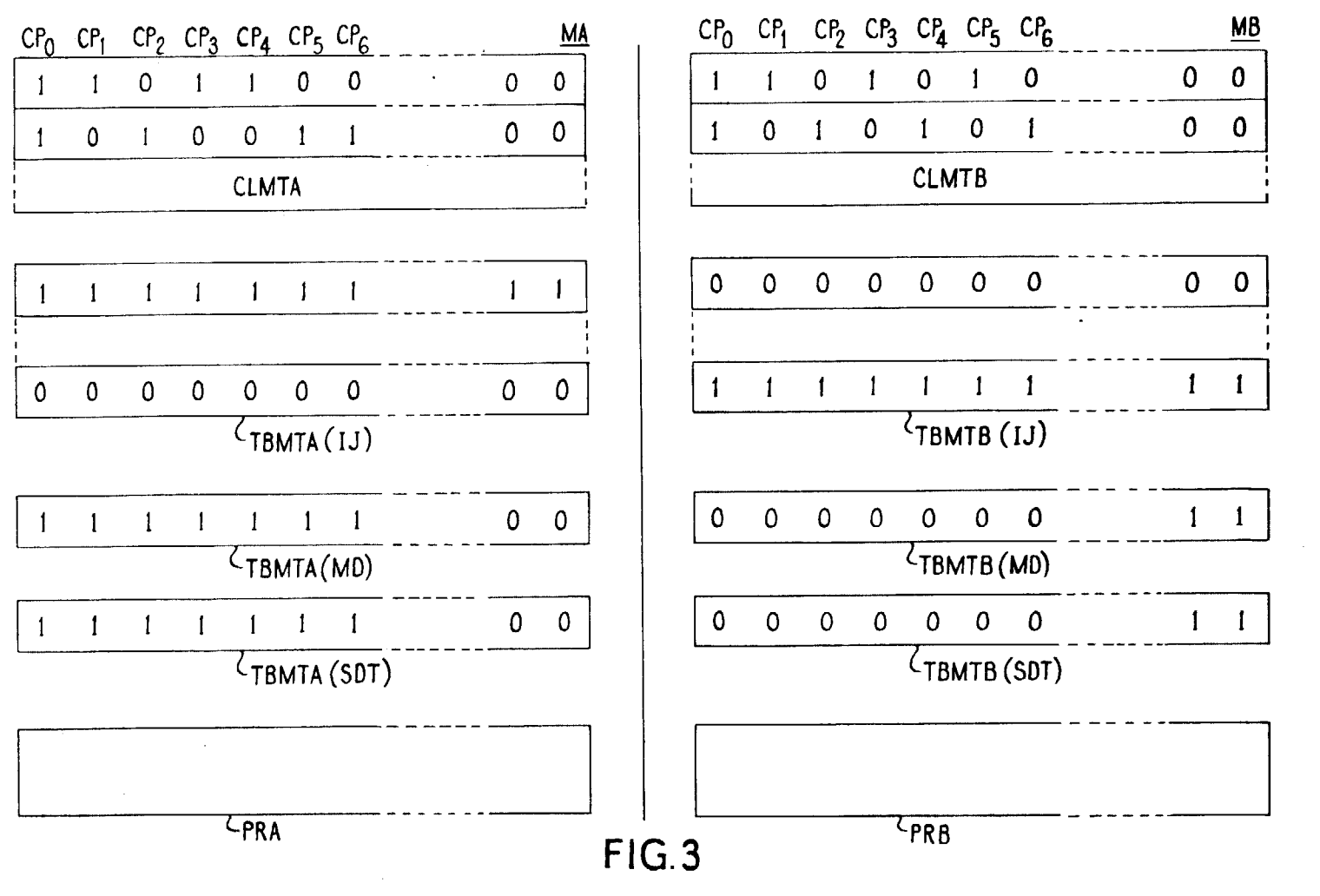
Figure 4:
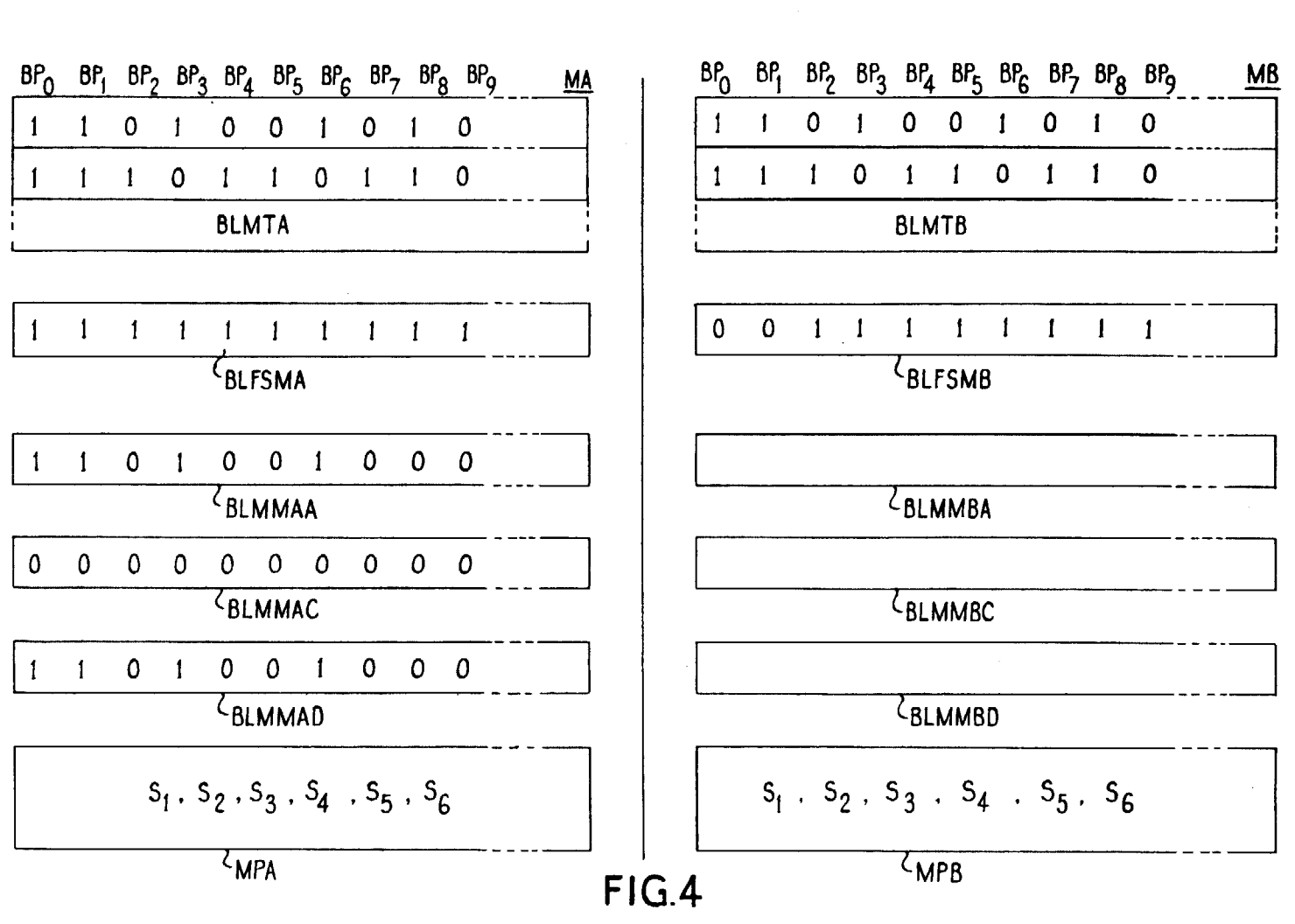

Principally referring to FIGS. 3 and 4 the 32-bits word memories MA and MB of the processors CPA and CPB respectively include:
  the programme address tables PRA and PRB;
  the clock level programme monitor tables CLMTA and CLMTB or clock level programme time tables;
  the base level programme monitor tables BLMTA and BLMTB or base level programme time tables;
  the base level function distribution masks BLFSMA and BLFSMB;
  the incoming junctor treated-by-me-tables BLMTA (IJ) and BLMTB (IJ);
  the marker driver treated-by-me tables TMBTA (MD) and TMBTB (MD);
  the signalling data tester treated-by-me tables TBMTA (SDT) and TMBTB (SDT).
  intermediate base level monitor masks BLMMAA and BLMMBA;
  previous and present base level monitor masks BLMMAC and BLMMAD for processor CPA and BLMMBC and BLMMBD for processor CPB;
  the memory parts MPA and MPB storing words S1 to S6.

The programme tables PRA and PRB are identical and store the addresses of the following programmes only some of which will be detailed later, the others being only given by way of example:
  Clock level programmes
  CP0 : marker driver unit clock level programme;
  CP1 : incoming junctor signalling data tester clock level programme;
  CP2 : outgoing junctor signalling data test clock level programme;
  CP3 : receiver signalling units tester clock level programme;
  CP4 : incoming junctor input buffer scanning clock level programme;
  CP5 : outgoing junctor input buffer scanning clock level programme;
  CP6 : receiver clock level programme.
  Base level programmes
  BPO : marker driver end-of-job scanning base level programme;
  BP1 : marker driver request buffer scanning and sequence order execution base level programme;
  BP2 : receiver base level programme;
  BP3 : sender base level programme;
  BP4 : high rate scanning base level programme;
  BP5 : receiver buffer scanning base level programme;
  BP6 : sender buffer scanning base level programme;
  BP7 : time out base level programme;
  BP8 : error hopper decoding base level programme;
  BP9 : device-out-of-service base level programme.

The clock level programmes are those programmes which must regularly be executed, the start of a series of such programmes being given every 10 milliseconds by a so called clock interrupt. The series of clock level programmes which are executed during such successive clock interrupt time intervals are however not the same since some of these programmes must be executed more frequently then others. When the clock level programmes of a series have been executed a base level programme is started and continued until the occurrence of a new clock interrupt, unless it is interrupted by a programme of higher priority.

The successive 32-bits words of the identical clock level monitor tables CLMTA and CLMTB indicate the series of clock level programmes which should normally consecutively be executed during successive clock interrupt intervals in the processors CPA and CPB respectively. After the last series has been executed the first series is executed again, etc. The columns of these tables hence indicate the frequency with which the programmes should be executed.
For instance:
  the first words of the tables indicate that the clock level programmes CP0, CP1, CP3 and CP4 should normally be consecutively executed during a clock interrupt time interval;
  the second words of the tables indicate that the clock level programmes CP0, CP2, CP5 and CP6 should normally consecutively be executed during a following clock interrupt time interval.

The successive 32-bits words of the identical base level monitor tables BLMTA and BLMTB indicate the series of base level programmes which should normally consecutively be executed in the processors CPA and CPB during successive base level time intervals, each such time interval starting after the wanted clock level programmes have been executed and finishing upon the occurrence of a subsequent clock interrupt.
For instance:
  the first words of the tables indicate that the base level programmes BP0, BP1, BP3, BP6 and BP8 should normally consecutively be executed during a base level time interval;
  the second words of the tables indicate that the base level programmes BP0, BP1, BP2, BP4, BP5, BP7 and BP8 should normally consecutively be executed during a following base level time interval.

The processors have the same base level monitor tables and the same clock level monitor tables for security reasons i.e. in order that these tables should be available when one of the memories MA, MB becomes faulty.

It should be noted that the position of a bit in a word of the monitor tables is the relative address of the corresponding programme in the programme address tables PRA and PRB. For instance, the position of bit 7 in the BLMTA is the relative address of the programme BP6 in the table PRA.

The base level function distribution masks BLFSMA and BLFSMB are each constituted by a 32-bits word the 1-bits and 0-bits of which indicate the base level programmes which are able (1-bit) to be executed and those which are prevented (0-bit) from being executed by the processor CPA, CPB during any base level time interval.
For instance:
  the base level function distribution mask BLFSMA shown indicates that processor CPA is able to execute all the base level programmes BP0 to BP9;
  the base level function distribution mask BLFSMB shown indicates that processor CPB is prevented from executing the base level programmes BP0 and BP1, but is able to execute the other base level programmes BP2 to BP9.

Since only 7 clock level programmes and 10 base level programmes have been considered it is clear that the bits 7 to 31 and 10 to 31 are 0 in CLMTA, CLMTB and BLMTA, BLMTB, BLFSMA, BLFSMB respectively.

From the above it follows that the various programmes BP0 to BP6 and CP0 to CP9 have been divided into two series:
- a first series with each programme thereof executed by one processor only i.e. programme BP0, BP1 executed by processor CPA. Although this is not the case here, it is clear that in some cases programmes may be distributed among both processors CPA and CPB in such a way that these processors execute distinct ones of these programmes;
- a second series with each programme thereof executed by at least two processors i.e. programmes BP2 to BP6 and CP0 to CP9 each executed by both processors CPA and CPB.

Although no clock level programme distribution masks are used here, it is clear that this may be useful in some cases. The advantage of such function or programme distribution masks is that they permit to easily distribute these functions or programmes among the processors, for instance to equalise the traffic load, and to modify this distribution when required.

The incoming junctor treated-by-me tables TBMTA (IJ) and TBMTB (IJ) are constituted by 32-bits words wherein each bit corresponds to an incoming junctor and to the associated input buffer and status buffer which are memory portions storing information about the incoming junctor. Each such bit indicates that the information relating to the corresponding incoming junctor must (1-bit) or must not (0-bit) be handled by a processor CPA, CPB, these tables being complementary to each other.

For instance:
- the first and last 32 bits words shown of the table TBMTA (IJ) indicate that the information relating to the corresponding junctor must be handled and not be handled by the processor CPA respectively;
- the first and last 32-bits words shown of the table TBMTB (IJ) indicate that the information relating to the corresponding junctor must not be handled and be handled by the processor CPB respectively.

The marker driver treated-by-me tables TBMTA (MD) and TBMTB (MD) are each constituted by a word wherein each bit corresponds to a distinct marker driver hopper which is a memory portion used to store information about operations to be executed by a marker driver unit MDU. Each such bit indicates that the corresponding marker driver hopper must (1-bit) or must not (0-bit) be handled by a processor CPA, CPB. These tables are complementary to each other.

The signalling data tester treated-by-me tables TBMTA (SDT) and TBMTB (SDT) are each constituted by a word wherein each bit corresponds to a distinct above mentioned signalling data tester. Each such bit indicates that the corresponding signalling data tester must (1-bit) or must not (0-bit) be handled by a processor CPA, CPB. These tables are complementary to each other and are for instance constituted by 16 1-bits followed by 16 0-bits and by 16 0-bits followed by 16 1-bits respectively. It should be noted that homologous bits of these tables correspond to homologous data testers i.e. to the two data testers forming part of a same module, one such tester being active and the other being a spare.

The position of each bit in a signalling data tester treated-by-me table or in a marker driver treated-by-me table which are each constituted by a single word is the relative address of the corresponding tester and marker driver in a group of maximum 32 such elements, whilst the position of each bit in an incoming junctor treated-by-me table which comprises a plurality of words is the relative address of the corresponding incoming junctor, and associated input and status buffers, in a set comprising a plurality of groups of 32 incoming junctors.

Since the programme BP0, BP1 is executed by processor CPA only, obviously its execution cannot give rise to conflicts with the processor CPB. This is however not the case with some of the other programmes which are executed in both processors and for this reason the above treated-by-me tables are used. Since each table indicates for a series of similar elements those which should and those which should not be handled by a processor and since two tables relating to similar elements are complementary there is no danger of conflicts. Moreover these tables also permit to easily distribute the processing of these elements among the processors, for instance in function of the traffic load.

The treated-by-me tables are also particularly useful when for instance one of the processors becomes faulty and the other must take-over the work of this faulty processor. Indeed, by setting all the bits of the treated-by-me tables of the correct processor to 1 the latter will automatically handle all the elements indicated by these tables.

The aim of the previous, intermediary and present base level monitor masks and of the memory parts MPA and MPB will become clear later.

Figure 5:
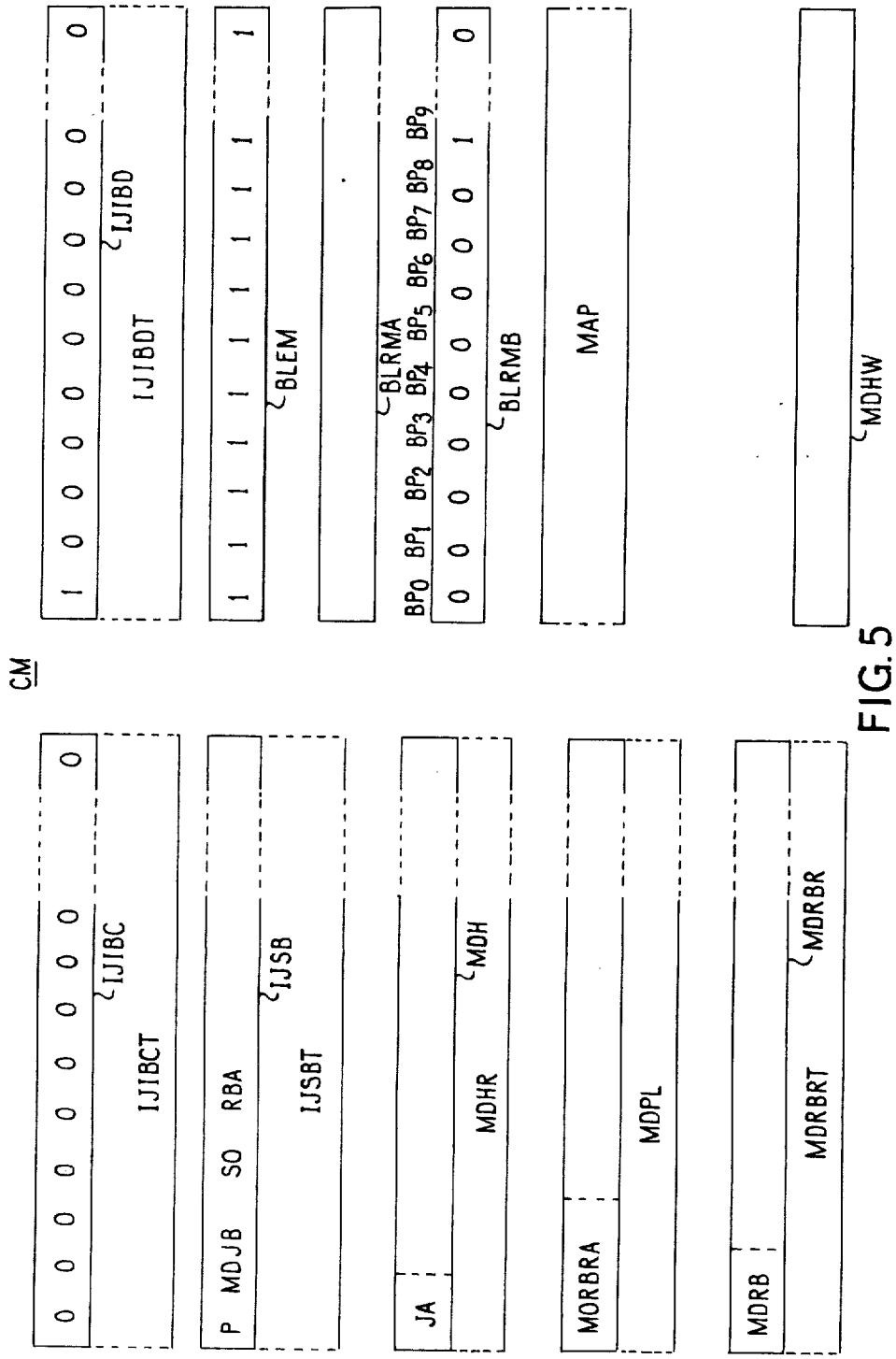
FIG. 5 represents the memory CM of FIG. 1 in more detail.

Principally referring to FIG. 5 the common memory CM schematically represented therein includes:
- a map MAP of 32-bits words used to store the busy-/free conditions of the incoming and outgoing junctors, receivers and senders and of the constituent links of the RSN, MSN, and SSN,
- previous and present junctor incoming input buffer tables such as IJIBCT and IJIBDT. The buffers such as IJIBC and IMIBD are each constituted by a 32-bits word and are used to store the previous and present loop conditions of 32 incoming junctors respectively;
- an incoming junctor status buffer table IJSBT wherein each buffer such as IJSB is constituted by a 32-bit word and is associated to an incoming junctor and used to store all information relating to a call communication involving this junctor;
- a marker driver request buffer table MDRBRT wherein each word, forming a marker driver request buffer is constituted by a word formed by 32 marker driver request bits such as MDRB. Each such MDRB is associated to an incoming junctor and when in the 1-condition indicates that a computer requests for a marker driver unit to handle this incoming junctor;
- a marker driver hopper word MDHW wherein each bit corresponds to a marker driver hopper and indicates whether this hopper must be treated (1 bit) or not (0-bit);
- a marker driver hopper table MDHT wherein each hopper such as MDH forms a waiting list of information to be handled by a marker driver unit;

a marker driver priority list MDPL indicating the priority of information to be handled by a marker driver unit;

a base level effective mask BLEM constituted by a word which is used to indicate by 0-bits those base level programmes which must not be executed due to no new information being available. The BLEM is stored in the common memory due to the fact that it is valid for both the processors and both processors must be able to modify it. An example of a programme for which normally no information is available is BP8 which is an error programme;

base level request masks BLRMA and BLRMB constituted by 32-bits words and used to indicate the base level programmes which must be executed as soon as possible by the processors CPA and CPB respectively and independently from other conditions. For instance, the BLRMB shown indicates that the base level programme BP9 must be executed as soon as possible by the processor CPB.

In order to make the invention clear the establishment of a connection between a calling incoming junctor, e.g. IJ, and a free receiver unit, e.g. RU, via the receiver signalling network RSN and under the control of the processor CPA is considered in relative detail hereinafter. By calling incoming junctor IJ is meant that this incoming junctor is connected via an incoming trunk IT to a distant exchange wherein a loop towards this incoming junctor has been closed.

It is supposed that the base level programme has just been interrupted by a 10 ms clock interrupt (FIG. 7). Thus a clock interrupt time interval is started together with a main programme MP (FIGS. 6,7). First the relative address of a word in the clock level monitor table CLMTA (FIG. 3) is loaded from the memory location S1 (FIG. 4) of the part MPA of the memory MA into the index register X and afterwards the address of the table CLMTA, i.e. of the first word of this table, is combined with this relative address to find the address of the above mentioned word in the table CLMTA. This word is loaded in the register A. It is supposed that this word is the first one of the table CLMTA shown. This word indicates that only the series of clock level programmes CP0, CP1, CP3 and CP4 should normally be executed in succession during the corresponding time interval. The contents of the index register X are then incremented by 1 and it is checked whether this register indicates a maximum number, i.e. the total number of words in the table CLMTA, or not. If this maximum is already reached the contents of the index register X are reset to zero before continuing the programme, whereas if the maximum is not yet attained — as is now the case — the programme is directly continued. The programme is more particularly continued by saving the contents of the index register X in the above mentioned memory location S1 of the memory MA in order that they should be available for later use.

It is then checked whether the contents of the above word stored in the register A are zero or not. In the positive the programme jumps to an instruction which will be described later, whereas in the negative — as is now the case — a find-first-one instruction FF0 is executed. This instruction which is described in Belgian Pat. No. 776,495 (U.S. Pat. No. 3,930,235 issued Dec. 30, 1975 to S. Kobus et al.) is used to find the position of the first 1-bit of the word stored in the register A, to combine this bit position with the contents of the index register and to reset this 1-bit in the register A. Since the contents of the X register are zero only the bit position found is finally registered therein.

The contents of the register A are saved in the memory location S2 of the part MPA of the memory MA and afterwards the position of the 1bit which is stored in the index register X is used to load in the register A the address in the table PRA of the clock level programme corresponding to this 1-bit position. Since the first 1-bit found of the word on which the FF0 instruction was executed corresponds to the clock level programme CP0, it is clear that the address of this programme CP0 will appear in the register A.

Figure 9:
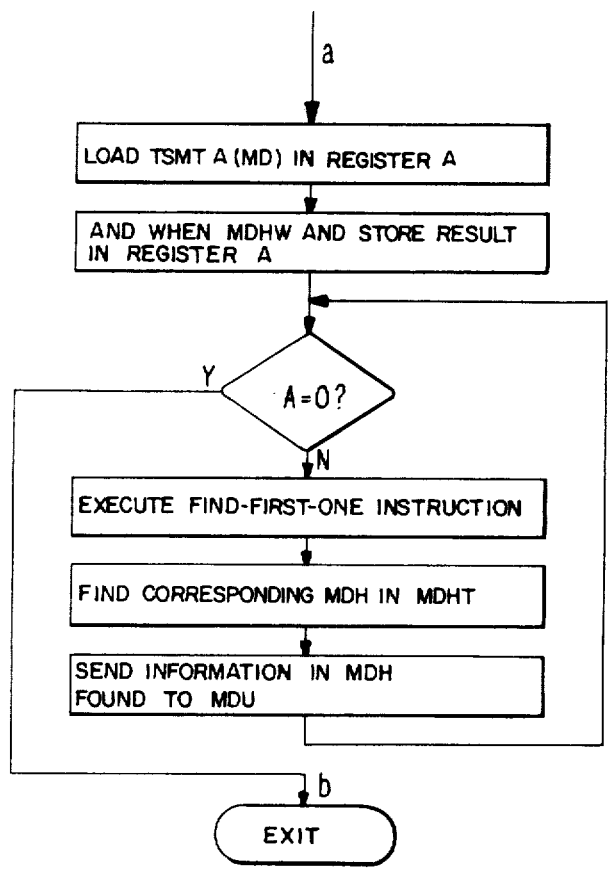
Figure 10:
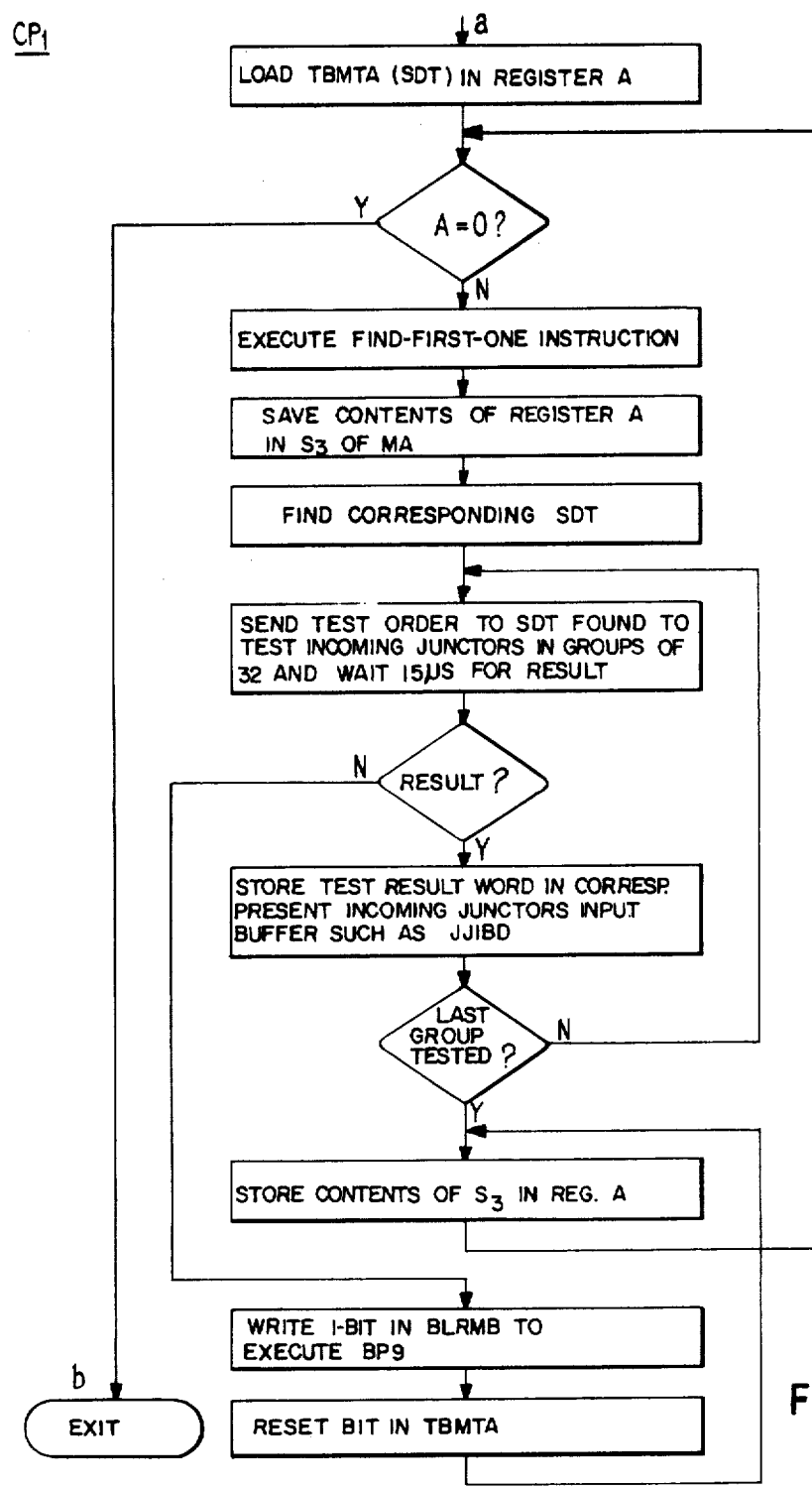
Figure 11:
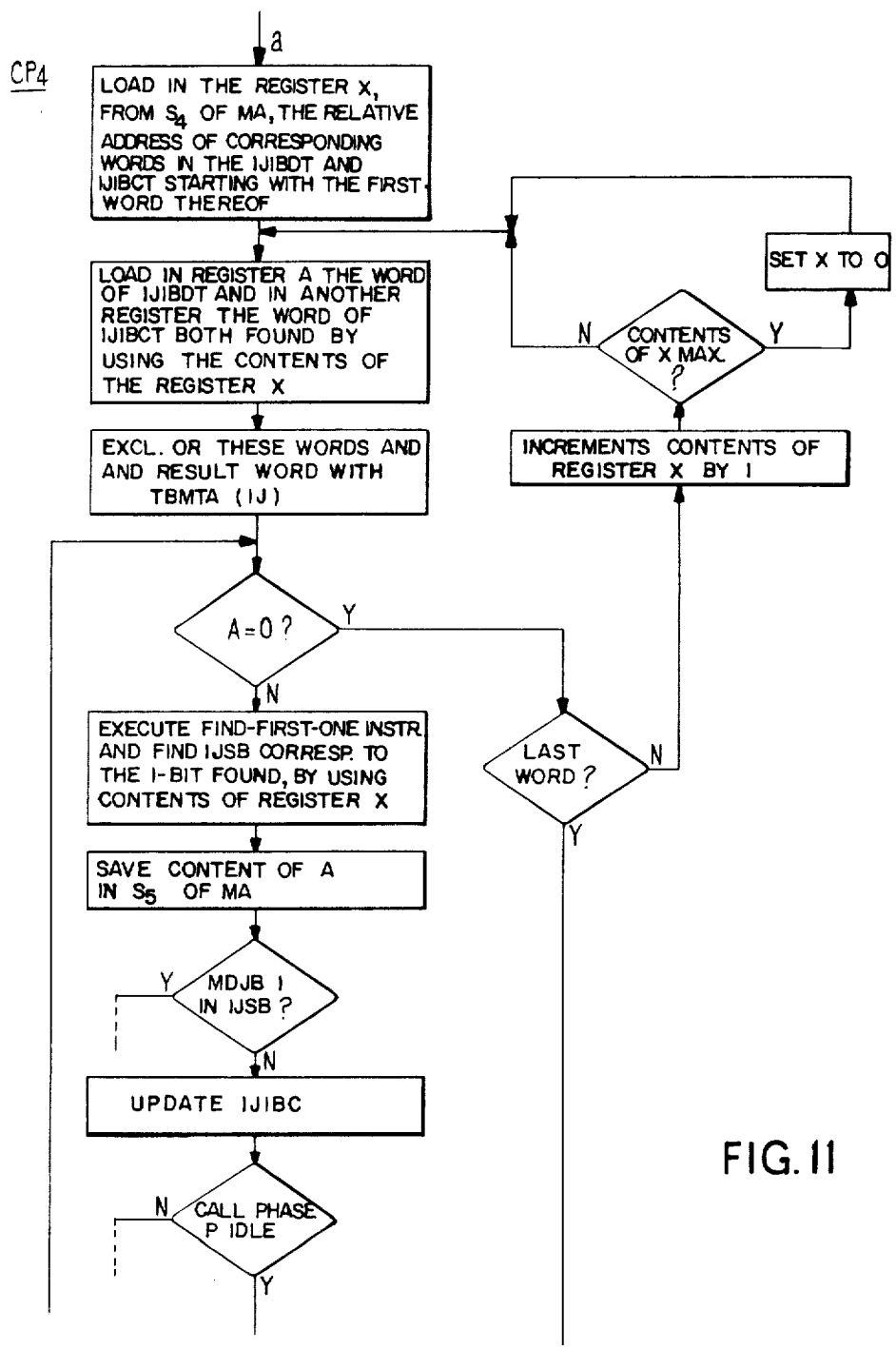
Figure 12:
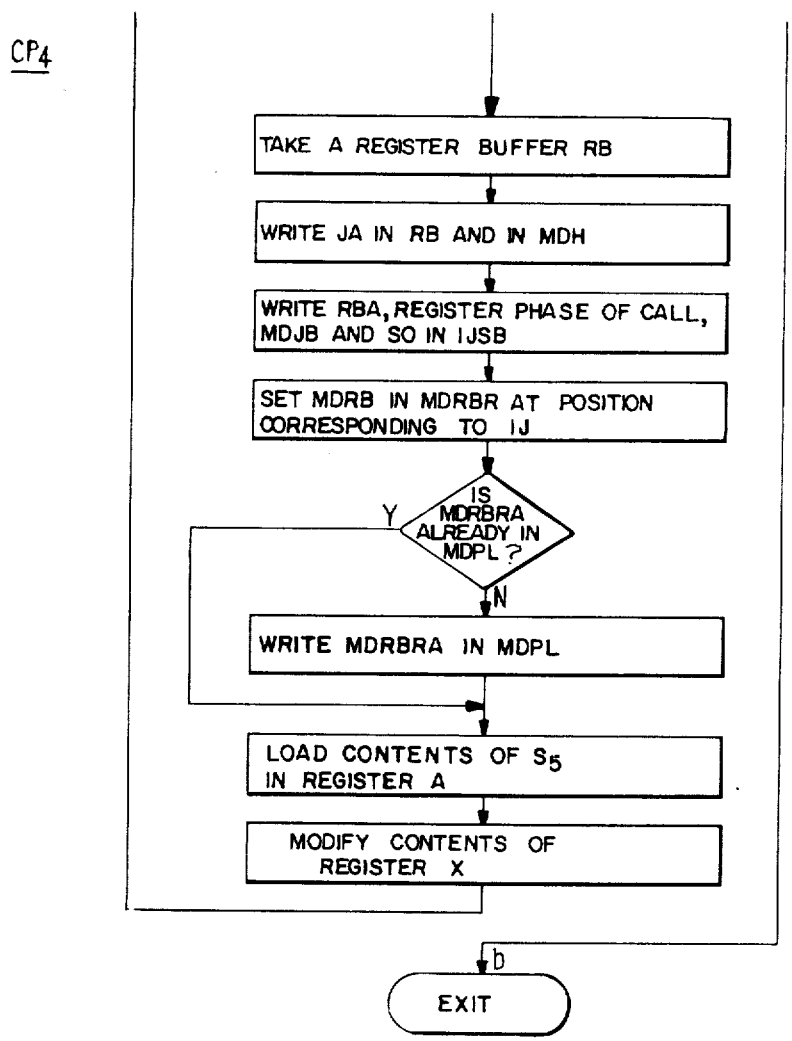
Figure 13:
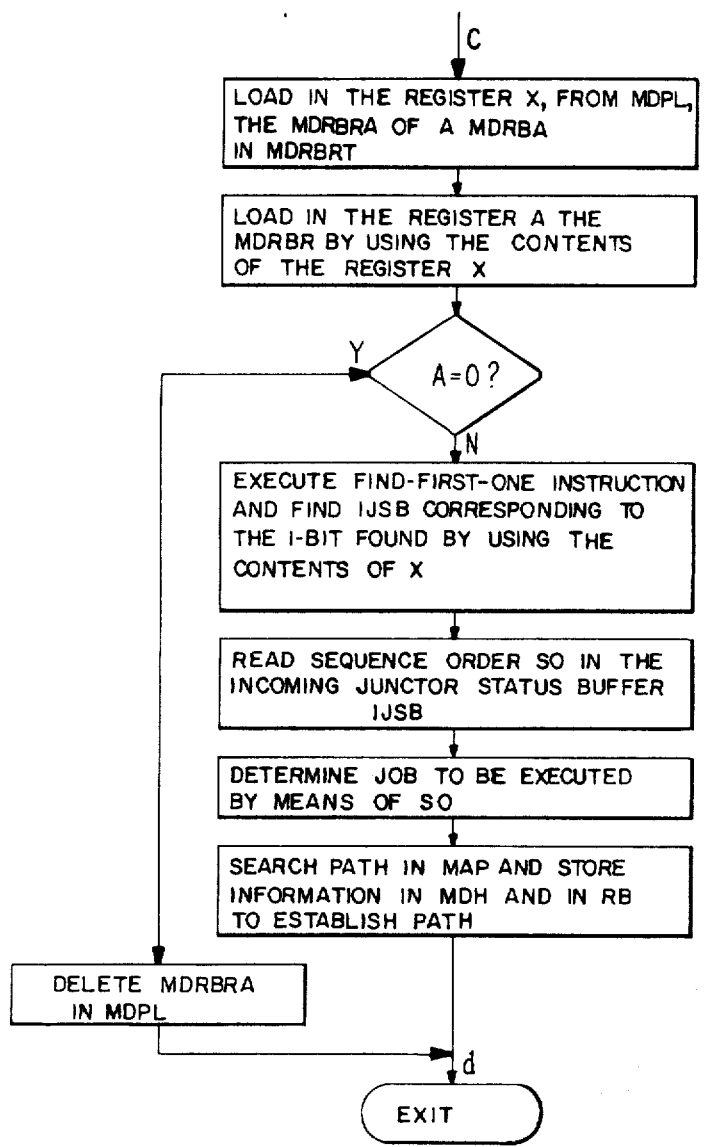

By means of this address the clock level programme CP0 represented on FIG. 9 is then found and executed and afterwards the contents of the memory location S2, i.e. 01011 followed by 0-bits, are transferred into the register A after which it is again checked whether the contents of this register A are zero or not.

It is clear that in the same way the programmes CP1, CP3 and CP4 will successively be found and executed. After having executed the last programme CP4 of this series the contents of the memory location S2 are again transferred into the register A where the check of these contents will then indicate that these contents are zero as a consequence of which the main programme will be continued in a manner described later.

From the above it follows that the clock level programmes, CP0, CP1, CP3 and CP4 are executed in succession.

The marker driver unit clock level programme CP0 (FIG. 9) controls the sending of information from a marker driver hopper such as MDH (FIG. 5) to be treated by the CPA to a marker driver unit such as MDU (FIG. 1) and controls the execution of the subsequent MDU operation. Since in the present case no information is supposed to be inscribed in a marker driver hopper (all the bits of the MDHW being 0) the programme CP0 is not executed. Although this programme CP0 is shown in relative detail on FIG. 9 it is not explained since it is without importance for the present invention.

The incoming junctor signalling data tester clock level programme CP1 (FIG. 10) starts by loading the signalling data tester treated-by-me table TBMTA (SDT) shown (FIG. 3) in the register A. By checking whether the contents of the register A are zero or not, one knows that there are no testers or at least one tester SDT to be operated by the processor CPA. In the first case the programme CP1 is finished, whereas in the second case an above mentioned find-first-one instruction is executed on the contents of the register A to find a tester to be operated. By this operation also the first 1-bit found in the register A is reset and the 1-bit position found is combined with the zero contents of the index register. The thus modified contents of the register A are stored in the memory location S3 (FIG. 4) of the part MPA of the memory MA and the address of the tester SDT to be handled by the CPA is derived from the contents of the index register X. The CPA then sends a test order to this signalling data tester SDT to test the loop conditions of the incoming junctors in groups of 32 and waits 15 microseconds for the result which is stored in a buffer register (not shown) of the peripheral circuitry PC.

When no result appears a 1-bit is inscribed on the position corresponding to the base level programme BP9 of the base level request mask BLRMB (FIG. 5) of processor CPB and in the TBMTA (SDT) the bit corresponding to the faulty tester SDT is reset to 0. The contents of the memory location S3 are then stored in the register A and the programme is continued by checking the contents of this register, as already described above.

It should be noted that by the modified BLRMB the processor CPB is requested to execute the base level device-out-of-service programme BP9, as will be explained later. The bit of the TBMTB (SDT) corresponding to the SDT which is the homologue of the faulty SDT will be set to 1 by the CPB during the execution of this programme BP9.

On the contrary, when a result appears the 32-bits result word is read and stored in a present incoming junctor input buffer corresponding to the group of 32 incoming junctors tested. It being supposed that the incoming junctor IJ shown in FIG. 1 is the first and the only one in the calling condition of the group of 32 tested, a word formed by a 1-bit followed by 31 0-bits is stored in the IJIBD shown. The test operation is repeated for all the groups of 32 incoming junctors which after it is checked whether there is still a tester to be operated by checking the contents of the register A after the contents of the memory location S3 have been transferred into it.

When finally all the testers indicated by the TBMTA (SDT) have been handled the programme CP1 is finished and followed by the execution of the outgoing junctor signalling data testing clock level programme CP3. This clock level programme CP3 is not considered here since it is not executed in the establishment of a connection between the calling incoming junctor IJ and a receiver unit such as RU.

The incoming junctor input buffer scanning clock level programme CP4 (FIG. 11) which is executed after CP3 starts by loading the relative address of corresponding words in the IJIBDT and in the IJIBCT from the memory location S4 (FIG. 4) of the part MPA of the memory MA into the index register X. Afterwards the address of the table IJIBDT, i.e. of the first word of this table, is combined with this relative address to find the address of the above mentioned word in the table IJIBDT. This word is loaded in the register A. It is supposed that this word is the first one IJIBD of the table IJIBDT shown. This word indicates that only for the first incoming junctor, which is supposed to be the IJ shown on FIG. 1, a 1 is registered in the A register. In the same way the first word IJIBC of the IJIBCT is loaded in another register (not shown) of the AU. These words are then exclusive OR-ed to find calling incoming junctors. The resultant word stored in the register A indicates that among a group of 32 incoming junctors considered only the incoming junctor IJ is in the calling condition. The word of the TBMTA (IJ) corresponding to other buffers IJIBD and IJIBC is then loaded in another register (not shown) of the AU and this word which is the first word shown of the table TBMTA (IJ) is then AND-ed with the above resultant word, the result being stored in the register A. This result is a word constituted by a 1-bit followed by 31 0-bits indicating that the calling incoming junctor IJ must be handled by the processor CPA.

It is then checked whether the contents of the register A are zero or not:

in the negative, as is now the case, an above mentioned find-first-one instruction is executed and the resultant 1-bit position is used to find an incoming junctor status buffer such as IJSB (FIG. 5) corresponding to the calling incoming junctor IJ. Since by this instruction the position of the first 1-bit found is combined with the contents of the index register, storing the relative address of a word in the tables IJIBCT and IJIBDT, the resultant contents of the index register indicate the position of this first 1-bit in the tables IJIBCT and IJIBDT. It is necessary to proceed in this way since the number of incoming junctors and incoming junctor status buffers is much larger than 32. After the contents of the register A have been stored in the memory location S4 of the memory MA, in the IJSB found it is then checked whether a marker driver job bit MDJB stored therein is in the 1-condition or not. This bit in the 1-condition indicates that a marker-driver operation in the incoming junctor IJ to which the IJSB is associated must or is being executed. If this bit is in the 1-condition other operations without importance for the present invention are executed, whereas if the bit MDJB is in the 0-condition, as is now the case, the programme CP4 is continued as will be described later;

in the positive it is checked whether the word in the register A is the last one to be handled or not. When this is true the programme CP4 is finished, whereas when this is not true the contents of the index register are incremented by 1. It is then checked whether these contents are maximum or not and in the positive these contents are reset. In both cases the following word of the last mentioned tables is treated in the same way as already described.

After in the IJSB considered the bit MDJB has been found in the 0-condition the contents of the IJIBD are transferred into the IJIBC, i.e. the latter is updated, and it is checked whether or not the phase information P stored in the IJSB indicates an idle phase or not. In the negative other operations without importance for the present invention are executed, whereas in the positive -as is now the case- a free register buffer (not shown) is searched and the address JA of the calling incoming junctor IJ associated to the IJSB is inscribed in this register buffer and in a marker driver hopper such as MDH (FIG. 5). Also the register buffer address RBA, the register phase of this call, a marker driver job bit 1 and a sequence order SO are written in the IJSB. The MDJB indicates that a marker driver job has to be executed, whilst the SO is used to find in memory this marker driver job. Afterwards a marker driver request bit MDRB is written in a marker driver request buffer MDRBR (FIG. 5) at a position corresponding to the calling incoming junctor IJ. This MDRB indicates that the intervention of the MDU is requested for this particular incoming junctor IJ.

It is then checked whether the address MDRBRA of the marker driver request buffer MDRBR has already been inscribed in the marker driver priority list MDPL or not.

in the negative, as is now the case, this address MDRBRA is written in the MDPL, information is transferred from S5 into A and the contents of the register X are modified so that this register again stores the same information as before the execution of the find-first-one instruction;

in the positive the same programme is executed as in the preceding negative case except for the inscription of the MDRBRA in the MDPL.

Returning now to the main programme MP on FIG. 7, when the programmes CP0, CP1, CP3 and CP4 have successively been executed the relative address of a word in the base level monitor table BLMTA (FIG. 4) is loaded in the index register X. Afterwards the address of this table-BLMTA, i.e., of the first word of this table, is combined with the relative address stored in the register X to find the address of the above mentioned word in the table BLMTA and this word is loaded in the register A. It is supposed that this word portion is the first of the table BLMTA shown (FIG. 4). This word indicates that only the base level programmes BP0, BP1, BP3, BP6 and BB9 should normally and if possible be executed in succession during the remaining portion, or base level time interval, of the above mentioned clock level time interval during which the above clock level programmes have been executed. The last mentioned word is then AND-ed with the base level function sharing mask BLFSMA (FIG. 4) and with the base level effective mask BLEM (FIG. 5) to obtain in the register A the intermediate base level monitor mask BLMMAA (FIG. 4). The possible 0's of the base level effective mask BLEM indicate those base level programmes which should not be executed since there is no new information to be handled by these programmes. Since the BLMTA word, BLFSMA and BLEM are as indicated on the FIGS. 4 and 5, the BLMMAA is as shown on FIG. 4 and indicates that the programmes BP0, BP1, BP3 and BP6 must be executed, if possible, during the above mentioned remaining portion of the clock interrupt time interval under consideration.

The BLMMAA is then inclusive OR-ed with the BLRMA to reckon with urgently requested base level programmes. Such a programme is for instance BP9, as already mentioned above. The thus obtained new BLMMAA which is hereinafter called BLMMAA' is then inclusive OR-ed with the previous BLMMAC to obtain the present BLMMAD and the latter then becomes the new previous BLMMAC. Since the BLRMA and the previous BLMMAC are supposed to be all-zero words, it is clear that the BLMMAD or the new BLMMAC is identical to BLMMAA and thus indicates that the programmes BP0, BP1, BP3 and BP6 should, if possible, be executed in succession.

From the above it follows that the following Boolean functions are calculated

BLMTA·BLFSMA·BLEM + BLRMA = BLMMAA'
BLMMAA' + BLMMAC = BLMMAD

As will become clear later, each time one of the base level programmes indicated by the BLMMAC is executed the corresponding bit is reset to 0 in this BLMMAC.

The reason for the last mentioned inclusive OR-ing is the following: it may happen that during a previous base level time interval it has not been possible to execute all the programmes indicated by the base level monitor mask, these programmes being indicated by 1's in the previous monitor mask BLMMAC. By the OR-ing operation these programmes are given a chance to be executed during the present base level time interval since they appear in the present base level monitor mask BLMMAD.

The contents of the index register X are then incremented by 1 and it is checked whether this register indicates a maximum number, i.e. the total number of words in the table BLMTA, or not. If this maximum is already reached the contents of the index register X are reset to zero before continuing the programme, whereas if the maximum is not yet attained the programme is directly continued. The programme is more particularly continued by saving the contents of the index register X in the memory location S6 of the memory MA in order that they should be available for later use. The clock level part of the main programme MP is then finished.

Afterwards the execution of the base level programmes is started by loading the new previous base level monitor mask BLMMAC in the register A, this BLMMAC being the BLMMAD shown in FIG. 4.

It is first checked whether the contents of this register A are zero or not. In the positive the programme is continued in a manner which will not be described further whereas in the negative -as is now the case- a find-first-one instruction is executed. This instruction finds the first 1-bit stored in the register A and afterwards resets this bit to 0. The contents of the register A thus modified are then saved in the BLMMAC and afterwards the position of the 1-bit stored in the index register X is used to load in the register A the address in the table PRA of the base level programme corresponding to this bit position. Since the first 1-bit of the above word corresponds to the marker driver end-of-job scanning base level programme BP0, it is clear that the address of this programme will be loaded in the register A.

By means of this address the base level programme BP0 is then found and executed and afterwards the BLMMAC is transferred into the register A after which it is again checked whether the contents of this register A are zero or not.

It is clear that in this way the programmes BP0, BP1, BP3 and BP6 will successively be found and executed. After having executed the last programme BP6 of this series the contents of the memory location S6 are again transferred into the register A where the check of these contents will then indicate that these contents are zero as a consequence of which further base level programmes which are not described here are possibly executed before the occurrence of a new clock interrupt.

From the above it follows that the base level programmes BP0, BP1, BP3 and BP6 are executed in succession.

The base level programme BP0 is the marker driver end-of-job scanning base level programme and is not described here.

The base level programme BP1 (FIG. 13) is the marker driver request buffer scanning and sequence order execution programme. This programme starts by loading the relative address MDRBRA of a marker driver request buffer MDRBR from the marker driver priority test MDPL into the index register X. Afterwards the address of the table MDRBRT wherein this MDRBR is stored, i.e. of the first word of this table, is combined with the above relative address to find the address of the MDRBR in the table MDRBRT. This buffer is loaded in the register A.

It is then checked whether these contents are zero or not, i.e. whether or not a bit MDRB is stored in this register A or not.

in the negative the MDRBRA is deleted from the MDPL and the programme BP1 is finished;
 in the positive, as is now the case since an MDRB bit is inscribed in MDRBR for the calling IJ, a findfirst-one instruction is executed and the resultant 1-bit position appearing in the index register X is used to find a corresponding incoming junctor status buffer such as IJSB (FIG. 5). In the IJSB found the sequence order SO is read and used to determine in the memory CM the job to be executed. This job in the present case consists in searching a path in the memory map MAP between the calling incoming junctor IJ and a free receiver unit and to store the found information in a marker driver hopper such as MDH. The programme BP1 is thus finished.

After the execution of the base level programme BP1 the programmes BP3 and BP6 are executed, if sufficiently time remains. These programmes are not described since they are without importance for the present invention.

Upon the occurrence of a new clock interrupt the above described operations are repeated, but now the clock and base level programmes indicated by the second words of CLMTA and BLMTA will be executed.

More particularly during the execution of the clock programme CP0 a path will be established between the calling IJ and a free receiver unit such as RU.

In the above it has been described how a bit corresponding to the base level programme BP9 is set in the base level request mask BLRMB of the processor CPB when a signalling data tester did not provide test information. Therefore, when the processor CPB afterwards calculates its present base level monitor mask BLMMBD a 1 will appear therein at the position corresponding to the programme BP9 so that this programme will subsequently be executed by this processor. This programme more particularly consists in setting a 1 in the treated-by-me table TBMTB (SDT) at the position corresponding to the tester which is the homologue of the faulty one. From the above it follows that by means of the base level request masks information may be exchanged between both the processors CPA and CPB.

Although the above described data processing system includes two computers with individual memories and a common memory, the invention is also applicable to a data processing system of the type disclosed in the above mentioned U.S. Pat. No. 3,557,315 (S. KOBUS et al 19-4-1-2-13) which includes two computers interconnected by intercomputer communication means since it is then sufficient to store the contents of the common memory in each of the individual memories. In both these systems a computer may take-over the work of the other computer when the latter becomes faulty since the correctly operating processor has always access to the information regarding the call communications handled by the other computer. Indeed, this information is either stored in the common memory or in the individual memory of the correct computer where it has been received from the now faulty computer via the intercomputer communication means during the correct operation of the latter computer.

While the principles of the invention have been described above in connection with specific apparatus, it is to be clearly understood that this description is made only by way of example and not as a limitation on the scope of the invention.

We claim:

1. An automatic communications switching system comprising a switching network for completing calls through the system, a data processing network for controlling the completion and supervision of calls through the system by the execution of programs, and a plurality of peripheral circuits interfacing between said switching network and data processing network to provide signals regarding the condition of the switching network to the processing network and for transmitting signals from the processing network for controlling and supervising the operation of the switching network, and in which said data processing network includes a first and a second processor, a first individual memory normally accessible only to the first processor for storing data including programs of a first set concerning calls being handled by said first processor, a second individual memory normally accessible only to the second processor for storing data including programs of said first set concerning calls being handled by said second processor, means in individual memories for storing address information of calls through peripheral circuits, the calls being handled by the processor associated with the respective individual memory, a further memory commonly accessible from both said first and said second processor for storing data representing conditions of said peripheral circuits being completed through said peripheral circuits under the control of both said processors in a load sharing manner and, in which each of said processors includes means to prevent said programs of said second set from being simultaneously executed by both processors to thereby give rise to conflicting situations due to the simultaneous handling of similar programs, said preventing means comprising a storage table individual to each processor, said table indicating the programs to be handled and not to be handled by the particular processor.

2. A system according to claim 1, in which each individual memory includes a time table for storing bit data of the various programs which should normally be executed by the processor during successive time intervals, the bit data of each word of this table indicating the programs which should normally be executed during the time interval corresponding to this word.

3. An automatic communications switching system according to claim 2, in which each of said processors is able to execute clock level and base level programs and a time table for base level programs, with each word of the clock level program time table indicating the clock level programs which should normally be executed during a corresponding time interval and each word of the base level program time table indicating the base level programs which should normally be executed during a corresponding time interval if possible and after the clock level programs which should normally be executed during this interval have been executed.

4. An automatic communications switching system according to claim 3, in which each individual memory includes a first mask word, the bit data of which indicates the programs the processor is permitted to execute, this processor being adapted to perform an AND function with a word of said time table and a first mask word to obtain a first resultant mask word indicating the programs which should normally be executed during the time interval corresponding to this word, and in which each of said individual memories includes a first mask word for said clock level programs and a first mask word for said base level programs, with said processor being adapted to perform an AND function with a word of said clock level program time table and said clock level program first mask word, a word of said base level program time table and said base level program first mask word.

* * * * *